SAMUEL LEWIS.
Improvement in Slat Matting for Car Floors, &c.

No. 118,952. Patented Sep. 12, 1871.

Witnesses:
John Becker.
Francis McArdle.

Inventor:
Samuel Lewis
Per Munn
Attorneys.

UNITED STATES PATENT OFFICE.

SAMUEL LEWIS, OF WILLIAMSBURG, NEW YORK.

IMPROVEMENT IN SLAT-MATTINGS FOR CAR-FLOORS, &c.

Specification forming part of Letters Patent No. 118,952, dated September 12, 1871.

*To all whom it may concern:*

Be it known that I, SAMUEL LEWIS, of Williamsburg, in the county of Kings and State of New York, have invented a new and useful Improvement in Slat-Matting; and I do hereby declare that the following is a full, clear, and exact description thereof, which will enable others skilled in the art to make and use the same, reference being had to the accompanying drawing forming part of this specification.

My invention has for its object to furnish an improved slat-matting for car-floors, saloon-floors, and other places, which shall be so constructed as not to be injured or broken by the expansion of the wooden slats, and not to be made loose and shaky by the contraction of said slats consequent upon change of temperature or dampness. It consists in the combination of rubber washers or buttons with the wooden slats and connecting-rods of the matting, as hereinafter more fully described.

Figure 1:
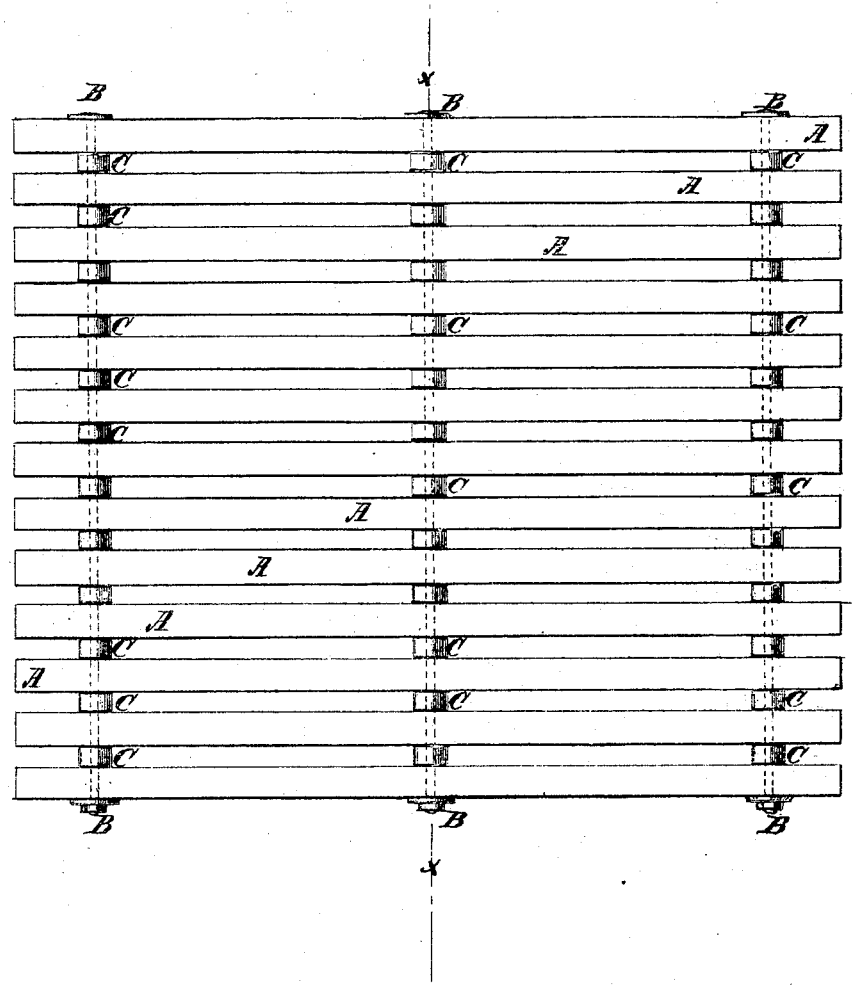
Figure 2:

A represents the wooden slats of the matting, which are strung upon rods B in the ordinary manner. C are rubber washers or buttons, which I prefer to make in the form of short tubes, and which are placed upon the rods B between the slats A, as shown in Figs. 1 and 2. The ends of the rods B are secured at the outer sides of the outer slats A by having heads formed upon them, or by nuts or other convenient means, metallic washers being used, if desired. By this construction, should the wooden slats A expand or swell, the rubber C will be compressed and the slats A and rods B will be prevented from being broken. The rubbers C are somewhat compressed when the matting is being made, so that, should the slats A shrink or contract, the rubbers C will expand and thus hold all the slats A securely in their proper relative positions. Should any of the slats A be accidentally broken, the expansion of the rubber blocks or washers C will take up the space, and thus keep the other slats securely in their places, and prevent all play or rattling of said slats, which is unavoidable when wooden or other unyielding washers are used. This construction also enables the wooden slats A to be made narrow to present the smallest possible face to receive dirt; and thin washers to be used, thus making the matting with narrow spaces between the slats, giving to it a neat and light appearance while having the requisite strength.

I am aware that rigid slat-mattings have been made in which the wooden slats were kept in their positions by wooden washers. This construction I do not claim; but

What I claim as my invention, and desire to secure by Letters Patent, is—

The combination of elastic-rubber blocks or washers C with the rods B and wooden slats A of a rigid slat-mat, substantially as herein shown and described, and for the purpose set forth.

The above specification of my invention signed by me this 26th day of July, 1871.

SAMUEL LEWIS.

Witnesses:
JAMES T. GRAHAM,
GEORGE W. MABEE.